United States Patent [19]
Namba et al.

[11] Patent Number: 5,866,803
[45] Date of Patent: Feb. 2, 1999

[54] GAS LEAKAGE DETECTION SYSTEM

[75] Inventors: Mitsuo Namba; Tsuneo Asayama; Satoshi Takahashi, all of Machida, Japan

[73] Assignee: Agency of Industrial Science and Technology, Tokyo, Japan

[21] Appl. No.: 894,704

[22] PCT Filed: Dec. 26, 1996

[86] PCT No.: PCT/JP96/03819
   § 371 Date: Aug. 28, 1997
   § 102(e) Date: Aug. 28, 1997

[87] PCT Pub. No.: WO97/24593
   PCT Pub. Date: Jul. 10, 1997

[30] Foreign Application Priority Data

Dec. 28, 1995 [JP] Japan .................................... 7-352158

[51] Int. Cl.⁶ .............................. G01M 3/08; G01M 3/04
[52] U.S. Cl. ............................................ 73/40.5 R; 73/40
[58] Field of Search .................................... 73/40, 40.5 R

[56] References Cited

U.S. PATENT DOCUMENTS 5,261,268  11/1993  Namba .

FOREIGN PATENT DOCUMENTS

| | | |
|---|---|---|
| 55-140036 | 11/1980 | Japan . |
| 58-84300 | 5/1983 | Japan . |
| 61-37175 | 2/1986 | Japan . |
| 3-267749 | 11/1991 | Japan . |
| 4-363638 | 12/1992 | Japan . |
| 5-248600 | 9/1993 | Japan . |
| 7-74769 | 8/1995 | Japan . |
| 8-30882 | 2/1996 | Japan . |
| 8-43236 | 2/1996 | Japan . |
| 8-43247 | 2/1996 | Japan . |
| 8-303700 | 11/1996 | Japan . |

*Primary Examiner*—Michael Brock
*Assistant Examiner*—Jay L. Politzer
*Attorney, Agent, or Firm*—Oblon, Spivak, McClelland, Maier & Neustadt, P.C.

[57] ABSTRACT

A gas leakage detection system permits the detection of gas leakage within a field of a definite scope to be performed easily and reliably. The gas leakage detection system comprises: gas supply amount detection means (1) that detects the amount of gas supplied at the main side of a gas line that branches out to individual gas users, gas usage detection means (2) that detects the amount of gas used by each of said individual gas users, and leakage determination means (3) that finds the total amount of gas used as the sum of the amounts of gas used by the individual gas users, compares this total amount of gas used against the aforementioned amount of gas supplied, and thus determines whether or not there is any leakage of gas between the main side of the gas line and the individual gas users.

1 Claim, 5 Drawing Sheets

GAS LEAKAGE DETECTION SYSTEM

TECHNICAL FIELD

This invention relates to a gas leakage detection system that detects the leakage of gas in a gas line system of a definite scope such as from the main side of a gas line, which branches out to individual gas users, to each of these gas users.

BACKGROUND ART

In a gas supply system for an apartment building or other type of collective housing area, there are cases in which a number of liquefied petroleum gas (LP gas) cylinders are arranged in a single location and the LP gas is supplied through gas lines from this single location to each household. In addition, in the case of municipal natural gas, the gas lines also branch out throughout a collective housing area, so the natural gas is supplied from the main side of these gas lines to each household.

The gas supply system in such a field of a definite scope is managed by the LP gas supplier that distributes the LP gas cylinders or the natural gas utility, whose employees regularly travel to the site and perform the stipulated inspection services. This management also includes surveillance for gas leakage, which is important from a safety standpoint.

However, the surveillance for gas leakage that is performed within the inspection services described above may not necessarily be performed regularly and must be done manually, and thus may not be performed frequently, so one cannot say that the gas supply system is under constant surveillance.

Moreover, the inspection for gas leakage must be performed over the entire field and thus consumes considerable time and effort, so this is a major burden on the LP gas supplier or natural gas utility.

In light of these problems, the object of the present invention is to provide a gas leakage detection system that can perform gas detection more easily and reliably.

DISCLOSURE OF THE INVENTION

In order to achieve the aforementioned objects, the gas leakage detection system of the present invention comprises: gas supply amount detection means that detects the amount of gas supplied at the main side of a gas line that branches out to individual gas users, gas usage detection means that detects the amount of gas used by each of said individual gas users, and leakage determination means that finds the total amount of gas used as the sum of the amounts of gas used by the individual gas users, compares this total amount of gas used against the aforementioned amount of gas supplied, and thus determines whether or not there is any leakage of gas between the main side of the gas line and the individual gas users.

Therefore, the work of receiving the amount of gas supplied and amount of gas used and determining whether or not leakage is present can be performed automatically.

The result of this determination is sent to the LP gas supplier or other central office, so the central office can keep gas leakage under constant surveillance.

In addition, an alarm is sounded at the central office when gas leakage is detected, so the central office side can immediately handle the situation.

BEST MODE FOR CARRYING OUT THE INVENTION

The invention will now be explained in more detail with reference to the appended drawings.

Figure 1:
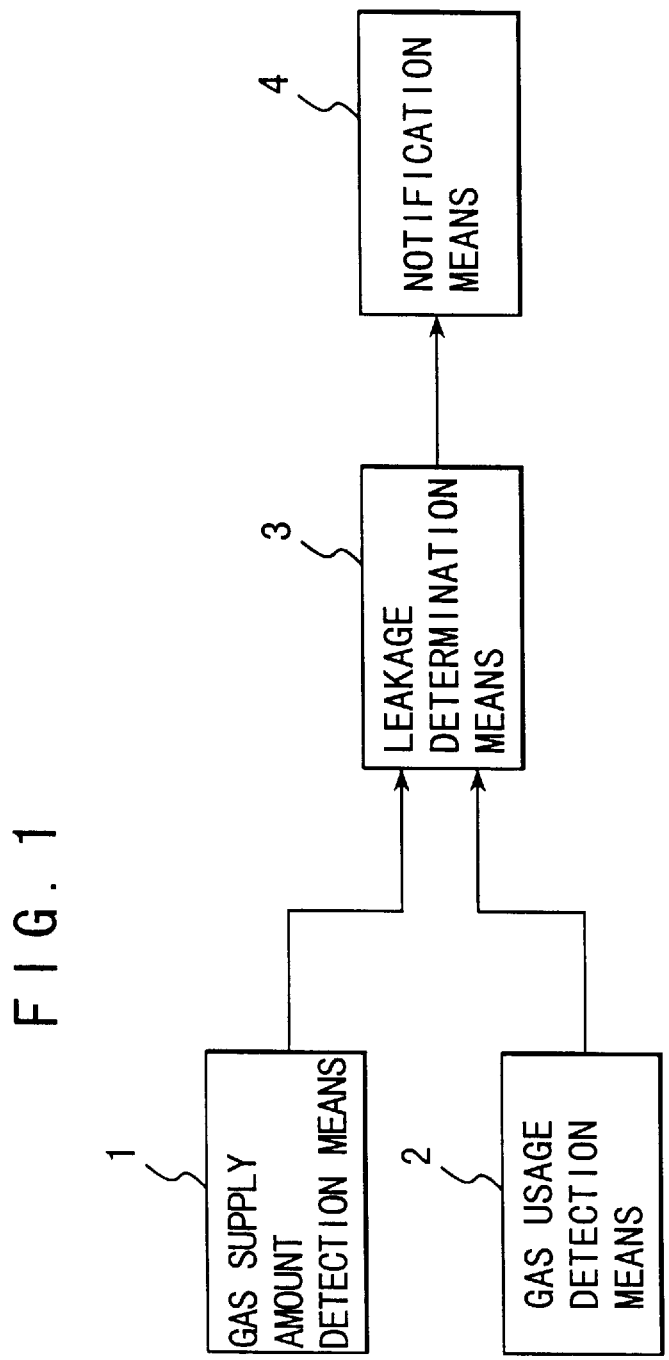
FIG. 1 is a block diagram illustrating the principle of the configuration of the gas leakage detection system of the present invention.

FIG. 1 is a block diagram illustrating the principle of the configuration of the gas leakage detection system of the present invention. In this diagram, gas supply amount detection means 1 detects the amount of gas supplied at the main side of a gas line that branches out to individual gas users, while gas usage detection means 2 detects the amount of gas used by each of said individual gas users. Moreover, leakage determination means 3 finds the total amount of gas used as the sum of the amounts of gas used by the individual gas users, compares this total amount of gas used against the aforementioned amount of gas supplied, and thus determines whether or not there is any leakage of gas between the main side of the gas line and the individual gas users.

The leakage determination means 3 automatically performs the work of receiving the amount of gas supplied and amount of gas used and determining whether or not there is any leakage, so the determination of gas leakage can be performed easily and reliably.

The result of this determination is sent to the LP gas supplier or other central office, so the central office can keep gas leakage under constant surveillance. In addition, an alarm is sounded at the central office when gas leakage is detected, so the central office side can immediately handle the situation.

Figure 2:
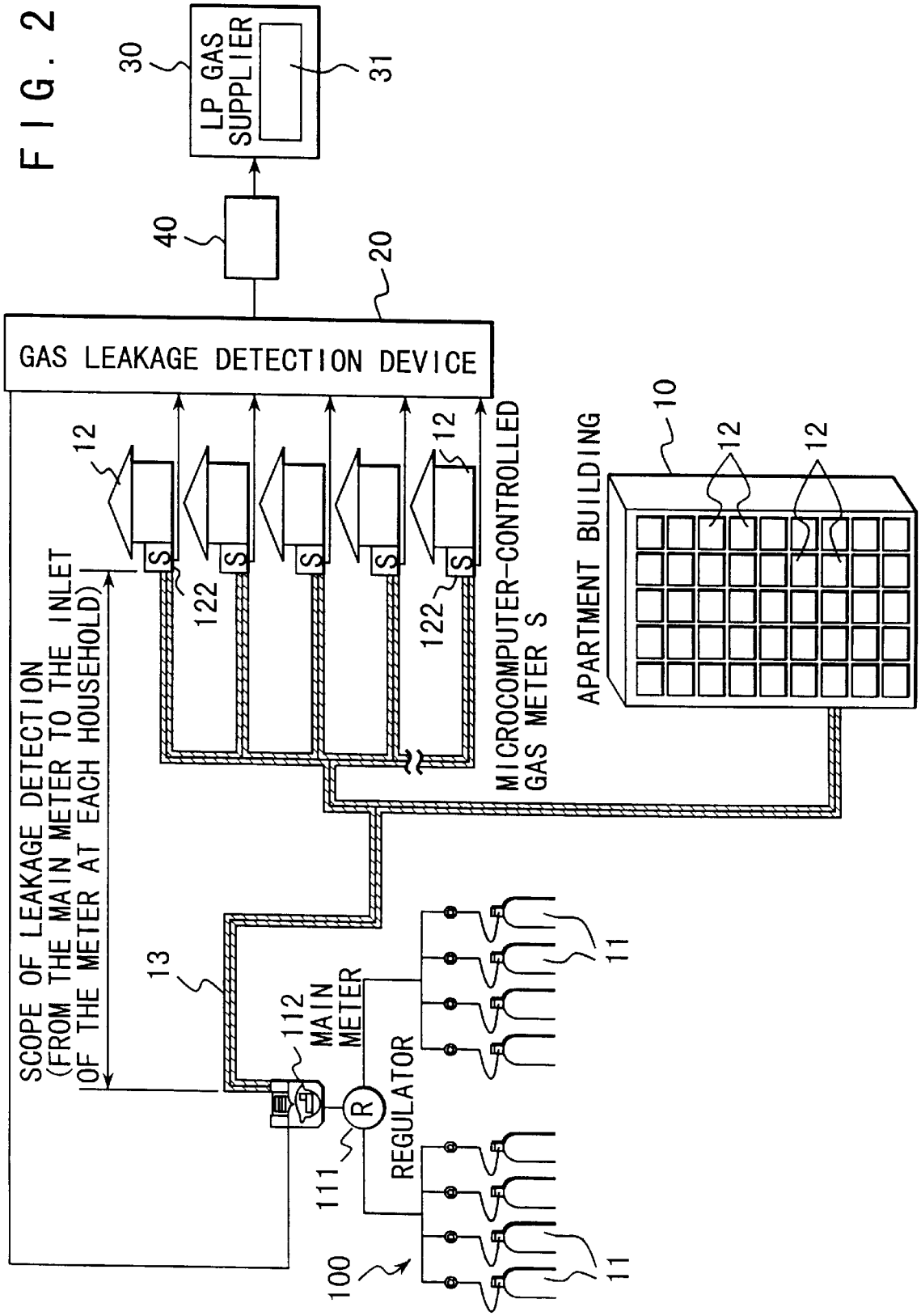
FIG. 2 is a drawing that illustrates one preferred embodiment of the gas leakage detection system of the present invention.

FIG. 2 is a drawing that illustrates one preferred embodiment of the gas leakage detection system of the present invention. In the drawing, a number of LP gas cylinders 11 are arranged in the cylinder storage yard 100 of an apartment building 10 and gas lines 13 are provided from this cylinder storage yard 100 to each of the households 12 of the apartment building 10, together forming a gas supply system for supplying LP gas to the entire apartment building 10.

The gas supplied from the LP gas cylinders 11 is regulated to a constant gas pressure by a pressure regulator 111 and then sent to each of the households 12 after passing through a gas meter 112 and gas lines 13. The gas meter 112 is the main meter that detects the gas flow supplied from the LP gas cylinders 11 which are the source of supply. In addition, each of the households 12 of the apartment building 10 is provided with a gas meter 122 as a branch meter that detects the gas usage flow at that household 12.

The gas meters 112 and 122 may be of the membrane type, for example, in which a membrane is driven by the flow of gas and a magnet rotates with the movement of this membrane so that a reed switch turns on and off as this rotating magnet gets closer to or further away from the reed switch. To wit, each time the membrane makes one round trip and the magnet makes one revolution, the reed switch turns on and off so a single pulse of a flow signal is generated, and this flow signal is counted to detect the flow of gas (read the meter).

A gas leakage detection system that detects leakage in the gas lines 13 is constructed in the gas supply system described above, and this gas leakage detection system is centered around a gas leakage detection device 20 placed in a stipulated location in the apartment building 10, for example the cylinder storage yard 100.

The gas leakage detection device 20 is a computer built around a CPU (not shown), and upon receiving input of meter reading signals from the gas meter 112 described above along with meter reading signals from each of the gas meters 122, the CPU follows a stipulated gas leakage determination processing program and makes determinations regarding gas leakage in the gas lines 13 (the route from the gas meter 112 to the gas meters 122) using these meter reading signals. Details of this follow later.

The gas leakage detection device 20 sends the result of this determination by ordinary public lines (telephone lines) 40 to the LP gas supplier acting as a surveillance center. The result of determination may be in the form "Definite Leakage," "Possible Leakage," "No Leakage" or the like.

A CRT or other display device 31 is provided at the LP gas supplier 30 so that information regarding the result of determination from the gas leakage detection device 20 is displayed. The LP gas supplier 30 receives these results of determination so that the gas supply system is under constant surveillance.

In particular, when a result of determination indicating "Definite Leakage" of gas is transmitted, an alarm is generated in addition to the display described above, so that personnel can be dispatched quickly to handle the leakage of gas.

Figure 3:
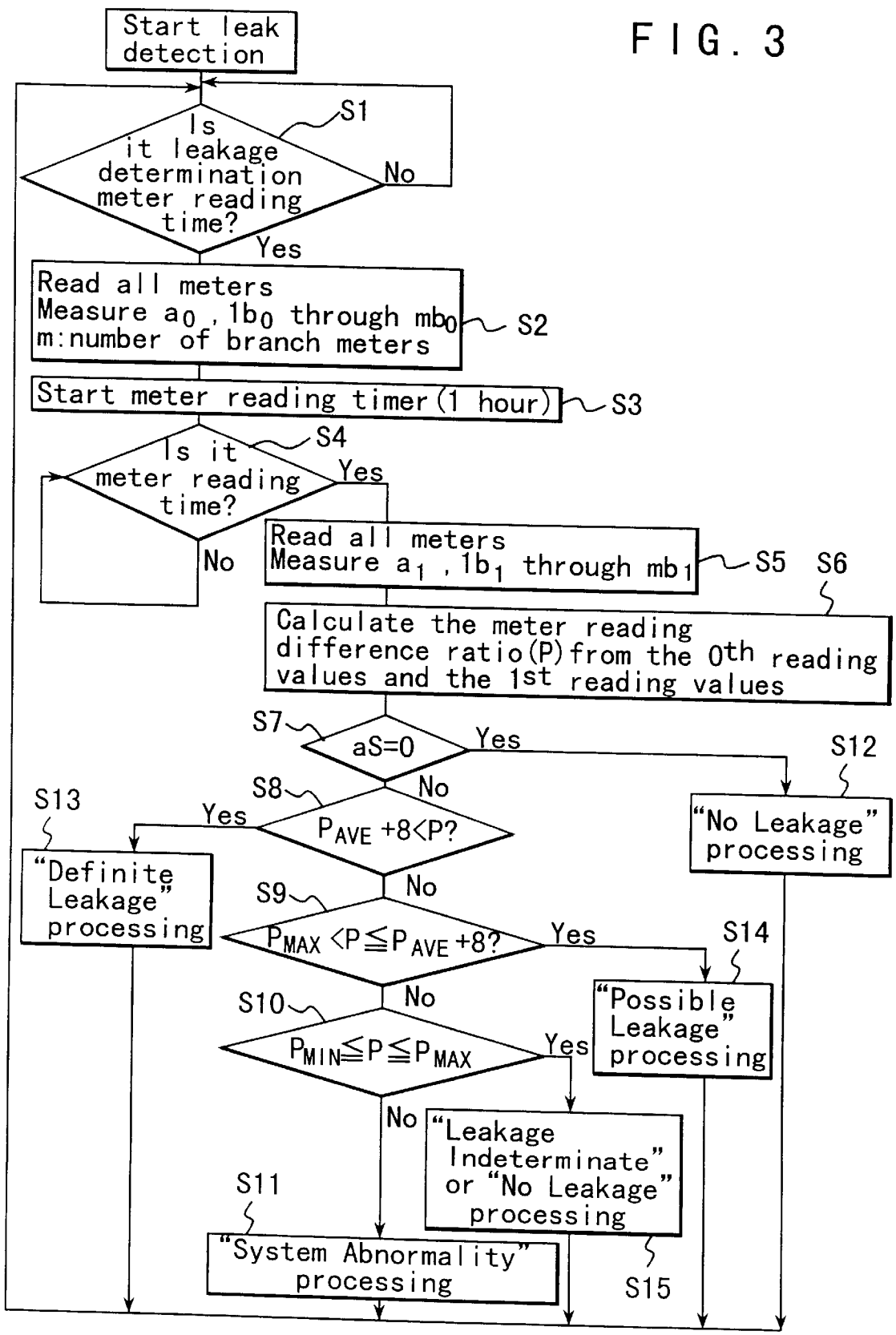
FIG. 3 is a flow chart of the gas leakage determination process executed by the gas leakage detection device.

FIG. 3 is a flow chart of the gas leakage determination process executed by the gas leakage detection device.

The gas leakage detection device 20 first, in Step S1, determines whether or not the time has reached the leakage determination meter reading time. This leakage determination meter reading time may be set, for example, to 11:00 pm every other day. If the time has reached the leakage determination meter reading time, processing proceeds to the next step, Step S2; if not, the device stands by until the leakage determination meter reading time is reached. Note that the leakage determination meter reading time is set as a result of learning, and details of this follow later.

In Step S2, all of the gas meters 112 and 122 are read and then processing proceeds to Step S3. Here, let $a_0$ be the meter reading value from the gas meter (main meter) 112 and let $1b_0$ through $mb_0$ be the meter reading values from the gas meters (branch meters) 122 (m is the total number of branch meters). During this meter reading, meter reading commands are first issued by the gas leakage detection device 20 to all of the gas meters 112 and 122, and in response to these commands the results of the meter readings are sent from all of the gas meters 112 and 122 to the gas leakage detection device 20. Note that the meter reading in this step, Step S2, is referred to as the $0^{th}$ meter reading.

In Step S3, a meter reading timer is started and then processing proceeds to Step S4. This meter reading timer may be set to a set time T of 1 hour, for example, and when the set time T is 1 hour, if the leakage determination meter reading time is 11:00 pm, then the timer will time out one hour later at 12:00 am.

In Step S4, a determination is made as to whether or not the set time T has elapsed, and if the set time T has elapsed, processing proceeds to the next step, Step S5.

In Step S5, all of the gas meters 112 and 122 are read in the same manner as in Step S2 and then processing proceeds to Step S6. Here, let $a_1$ be the meter reading value from the gas meter (main meter) 112 and let $1b_1$ through $mb_1$ be the meter reading values from the gas meters (branch meters) 122 (m is the total number of branch meters). Note that the meter reading in this step, Step S6, is referred to as the $1^{st}$ meter reading.

In Step S6, the $0^{th}$ meter reading values and the $1_{st}$ meter reading values are used to find the gas volume that passed through gas meter 112 ($a_s$) according to equation (1) along with the total gas volume that passed through gas meters 122 ($b_s$) according to equation (2), and moreover these values $a_s$ and $b_s$ are used to find the meter reading difference ratio (differential volume ratio) P, and then processing proceeds to Step S7.

$$a_s = a_1 - a_0 \tag{1}$$

$$b_s = (1b_1 - 1b_0) + (2b_1 - 2b_0) + (3b_1 - 3b_0) + \ldots (mb_1 - mb_0) \tag{2}$$

$$P = [(a_s - b_s)/a_s] \times 100 \tag{3}$$

Generally, if one assumes that the value found by subtracting the total gas volume that passed through gas meters 122 ($b_s$) from the gas volume that passed through gas meter 112 ($a_s$) to be the meter reading difference ($a_s - b_s$), and that there is no error between the various meter reading values and the true volume that passed through, if this meter reading difference is 0 then this represents no leakage, but if the value is greater than 0, this value is equivalent to the volume of gas that leaked out, so one can determine that gas leakage has occurred.

The presence of gas leakage in the gas lines 13 can be presumed from the meter reading difference ($a_s - b_s$) as described above, but this meter reading difference ($a_s - b_s$) always contains error with respect to the true value, so in this system, the meter reading difference ratio P is introduced as the basic value used for determination of leakage in consideration of the error in this entire system.

In this manner, by calculating the ratio of the meter reading difference ($a_s - b_s$) to the gas volume that passed through gas meter 112 ($a_s$) as the meter reading difference ratio P, the effects of various errors in the entire system (main meter, branch meters and piping system), can be thought to be included in this meter reading difference ratio P. Moreover, since the effects due to the main meter and branch meter flow are inherent in this meter reading difference ratio P, the overall error can be presumed to have a certain amplitude (error range $\Delta R$). The error range $\Delta R$ is a value found when there is no abnormality with the piping systems and the like, and is an error included in the meter reading difference using the meter reading value of the main meter as a basis.

In the next step, Step S7, a determination is made with respect to whether or not the gas volume that passed through gas meter 112 ($a_s$) is 0, and if as is 0, then no gas was supplied and so there is no possibility of leakage, and thus processing proceeds to Step S12 and a result of determination indicating "No Leakage" is sent to the LP gas supplier 30 and then the gas leakage determination process is halted. On the other hand, if the volume $a_s$ is not 0, then processing proceeds to Step S8.

In Step S8, a value ($P_{AVE} + \Delta R$) found by adding the meter reading difference ratio average value $P_{AVE}$, found in advance by learning, to the error range $\Delta R$ described above is used as a first reference ratio, and a determination is made as to whether or not the meter reading difference ratio P is greater than the first reference ratio ($P_{AVE} + \Delta R$), and if P is greater than the first reference ratio ($P_{AVE} + \Delta R$) then processing proceeds to Step S13 and a result of determination indicating "Definite Leakage" is sent to the LP gas supplier 30 and then the gas leakage determination process is halted. In the event of "Definite Leakage," an alarm is sounded at the LP gas supplier 30, the estimated flow Q $(=(a_s-b_s)/\Delta T)$ is calculated from the meter reading interval time $\Delta T$ (here, 1 hour), and this estimated flow Q is also sent to notify the LP gas supplier 30 of the extent of the leakage.

Note that the error range $\Delta R$ can be set arbitrarily, and by setting it in a trial-and-error manner that is empirical to a certain extent, it is possible to improve the accuracy of leakage determination.

When the error range $\Delta R$ was set to 8%, for example, the meter reading difference ratios obtained during a learning period of 1 week (to be described later) were all below the first reference ratio, and thus false alarms due to error (deviation) can be avoided yet gas leakage can still be detected reliably.

This error range of 8% was found as a result of a field test as being effective for a collective housing area of roughly 25 households, and in a collective housing area of fewer households, the error range $\Delta R$ was smaller, but in a collective housing area of more households, the error range $\Delta R$ was larger, so it is possible to increase the accuracy of detection of gas leakage to the greatest extent while still avoiding false alarms.

If the meter reading difference ratio P is less than or equal to the first reference ratio $(P_{AVE}+8)\%$ in Step S8, processing proceeds to the next step, Step S9.

In Step S9, the maximum value of the meter reading difference ratios $P_{MAX}$ found in advance by learning is used as a second reference ratio, and a determination is made as to whether or not the meter reading difference ratio P is greater than the second reference ratio $P_{MAX}$ and less than or equal to the first reference ratio $(P_{AVE}+8)\%$, and if the meter reading difference ratio P is in this range, then processing proceeds to Step S14 and a result of determination indicating "Possible Leakage" is sent to the LP gas supplier 30 and then the gas leakage determination process is halted.

If the meter reading difference ratio P is less than or equal to the second reference ratio $P_{MAX}$ in Step S9, processing proceeds to the next step, Step S10.

In Step S10, the minimum value of the meter reading difference ratios $P_{MIN}$ found in advance by learning is used as a third reference ratio, and a determination is made as to whether or not the meter reading difference ratio P is greater than the third reference ratio $P_{MIN}$ and less than or equal to the second reference ratio $P_{MAX}$, and if the meter reading difference ratio P is in this range, then processing proceeds to Step S15 and a result of determination indicating "Leakage Indeterminate" or "No Leakage" is sent to the LP gas supplier 30 and then the gas leakage determination process is halted.

If the meter reading difference ratio P is less than or equal to the third reference ratio $P_{MIN}$ in Step S10, processing proceeds to the next step, Step S11.

In Step S11, since the meter reading difference ratio P is less than the third reference ratio $P_{MIN}$, a value it cannot take normally, a result of determination indicating "System Abnormality (Re-Check System Operation)" is sent to the LP gas supplier 30 and then the gas leakage determination process is halted.

In this manner, in this preferred embodiment, a value $(P_{AVE}+\Delta R)$ found by adding the meter reading difference ratio average value $P_{AVE}$, found in advance by learning, to the error range $\Delta R$ described above is used as a first reference ratio, and the maximum value of the meter reading difference ratios $P_{MAX}$ and the minimum value of the meter reading difference ratios $P_{MIN}$ found in advance by learning are used as the second reference ratio and third reference ratio, respectively, so the meter reading difference ratio P at the time of leakage determination is compared against the first reference ratio, second reference ratio and third reference ratio to make a determination of leakage.

The leakage determination meter reading time, meter reading difference ratio average value $P_{AVE}$, error range $\Delta R$, maximum value of the meter reading difference ratios $P_{MAX}$ and the minimum value of the meter reading difference ratios $P_{MIN}$ are determined by learning.

This learning is performed by checking the entire piping system to verify that there is no leakage prior to putting this gas leakage detection system into operation, and an overview of learning is given below.

To wit, when learning is started, the main meter and all of the branch meters are read simultaneously once every unit period (e.g., 1 hour) and after each meter reading, the meter reading difference ratios $P_n$ are calculated from the previous meter reading value.

This meter reading difference ratio $P_n$ is recorded during the learning period (e.g., one week) and the maximum value of the meter reading difference ratios $P_n$ ($P_{MAX}$) and the minimum value of the meter reading difference ratios $P_n$ ($P_{MIN}$) are found. In addition, the meter reading difference ratio $P_{n(0-last)}$ based on the first meter reading value after the start of learning and the last meter reading value before the end of learning is calculated, and this value is set as the meter reading difference ratio average value $P_{AVE}$.

In addition, when the data groups of meter reading difference ratios $P_n$ sampled over the learning period every unit time are arranged in the same time bands, a time band in which the data is near the meter reading difference ratio average value $P_{AVE}$ and dispersion is low (when the branch meter gas usage patterns are thought to be constant) is determined (e.g., the time band from 11:00 pm to 12:00 am), and thereafter this time band is used as the meter reading time band for leakage determination, and this determines the leakage determination meter reading time.

Here follows a description of the learning described above made with reference to FIG. 4.

Figure 4:
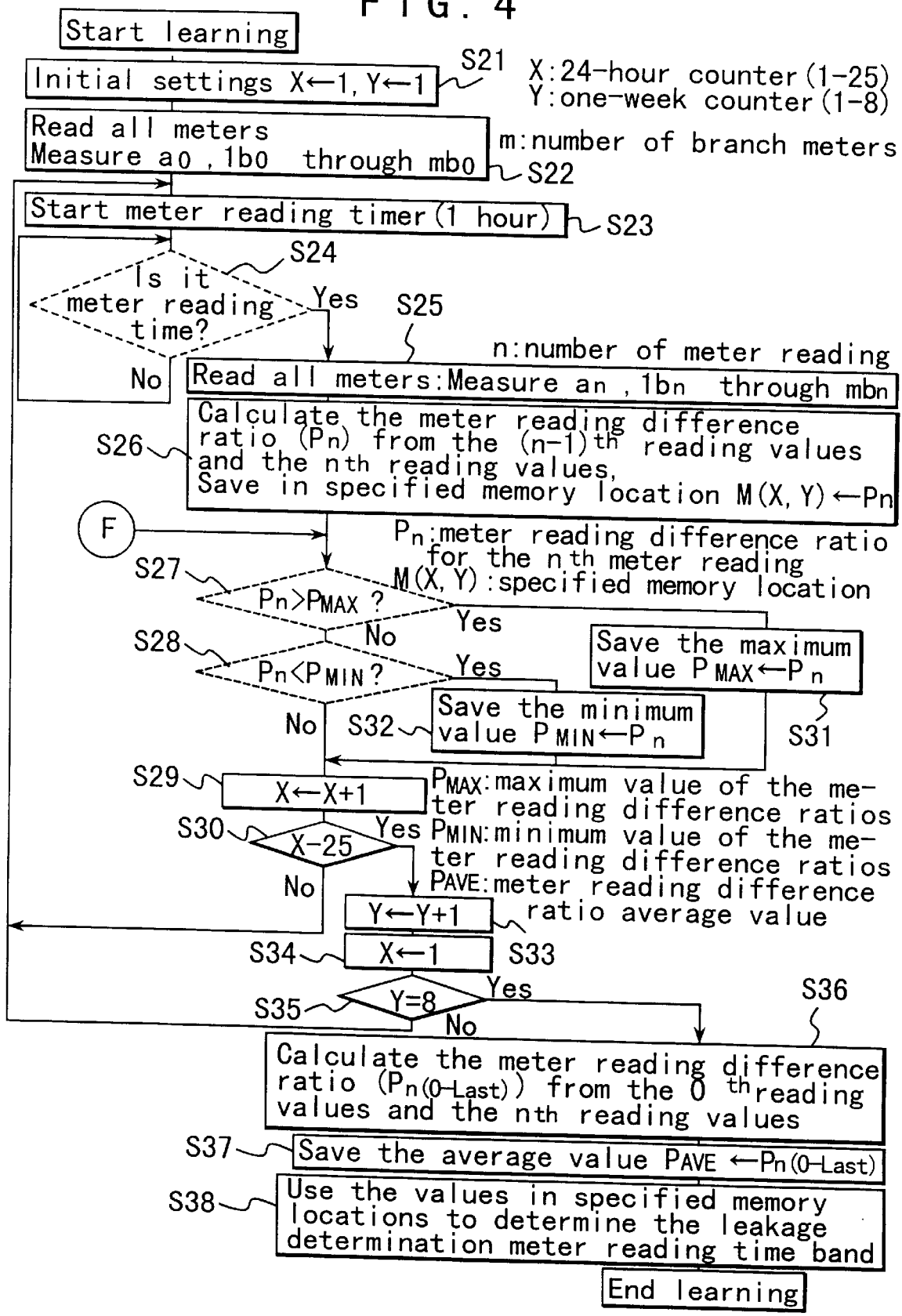
FIG. 4 is a flow chart illustrating the procedure of a learning method.

FIG. 4 is a flow chart illustrating the procedure of the learning method. In this learning method, first, in Step S21, a count value X for a 24-hour counter (1–25) and a count value Y for a one-week counter (1–8) are both set to 1 as their initial settings, and then processing proceeds to Step S22.

In Step S22, all of the gas meters 112 and 122 are read and then processing proceeds to Step S23. Here, let $a_0$ be the meter reading value from the gas meter (main meter) 112 and let $1b_0$ through $mb_0$ be the meter reading values from the gas meters (branch meters) 122 (m is the total number of branch meters). During this meter reading, meter reading commands are first issued by the gas leakage detection device 20 to all of the gas meters 112 and 122, and in response to these commands the results of the meter readings are sent from all of the gas meters 112 and 122 to the gas leakage detection device 20. Note that the meter reading in this step, Step S22, is referred to as the $0^{th}$ meter reading.

In Step S23, a meter reading timer is started and then processing proceeds to Step S24. This meter reading timer may be set to a set time T of 1 hour, for example.

In Step S24, a determination is made as to whether or not the set time T has elapsed, and if the set time T has elapsed, processing proceeds to the next step, Step S25. Note that this meter reading is the $n^{th}$ (n=0, 1, 2, . . . ) meter reading.

In Step S25, all of the gas meters 112 and 122 are read in the same manner as in Step S22 and then processing proceeds to Step S26. Here, let an be the meter reading value this time from the gas meter (main meter) 112 and let $1b_n$ through $mb_n$ be the meter reading values this time from the gas meters (branch meters) 122 (m is the total number of branch meters).

In Step S26, the meter reading difference ratio $P_n$ is calculated after each meter reading from the previous meter reading values. To wit, the $(n-1)^{th}$ meter reading values and the $n^{th}$ meter reading values are used to find the gas volume that passed through gas meter 112 ($a_{sn}$) according to equation (4) below along with the total gas volume that passed through gas meters 122 ($b_{sn}$) according to equation (5), and moreover these values $a_{sn}$ and $b_{sn}$ are used to find the meter reading difference ratio $P_n$, and the meter reading difference ratio $P_n$ thus found is saved in a specified memory location M (X, Y) allocated for this purpose. Then, processing proceeds to Step S27.

$$a_{sn} = a_n - a_{(n-1)} \quad (4)$$

$$b_{sn} = (1b_n - 1b_{(n-1)}) + (2b_n - 2b_{(n-1)}) + (3b_n - 3b_{(n-1)}) + \ldots (mb_n - mb_{(n-1)}) \quad (5)$$

$$P_n = [(a_{sn} - b_{sn})/a_{sn}] \times 100 \quad (6)$$

In Step S27, a determination is made as to whether or not the current meter reading difference ratio $P_n$ is greater than its largest value so far, $P_{MAX}$, and if $Pn > P_{MAX}$ then processing proceeds to Step S31 and $P_n$ is saved as the new $P_{MAX}$, but if $P_n \leq P_{MAX}$ then processing proceeds to Step S28.

In Step S28, a determination is made as to whether or not the current meter reading difference ratio $P_n$ is less than its largest value so far, $P_{MIN}$, and if $P_n < P_{MIN}$ then processing proceeds to Step S32 and $P_n$ is saved as the new $P_{MIN}$, but if $P_n < P_{MIN}$ is not true, namely if $P_{MIN} \leq P_n \leq P_{MAX}$ then processing proceeds to Step S29.

In Step S29, the count value X of the 24-hour counter is incremented by 1 and processing proceeds to Step S30.

In Step S30, a determination is made as to whether or not the count value X of the 24-hour counter has reached 25, and if X has reached 25 then processing proceeds to Step S33, and if not processing returns to Step S23 and the portion starting with Step S23 is repeatedly executed until X becomes 25.

In Step S33, one day's worth of learning is complete, so the count value Y of the one-week counter is incremented by 1 and then processing proceeds to Step S34.

In Step S34, this is the start of a new day, so X is set to 1 and then processing proceeds to Step S35.

In Step S35, a determination is made as to whether or not the count value Y of the one-week counter has reached 8, and if Y has reached 8 then processing proceeds to Step S36 as the end of the one-week learning period, and if not processing returns to Step S23 and the portion starting with Step S23 is repeatedly executed until Y becomes 8.

In Step S36, the $0^{th}$ meter reading values (Step S22) and the $(n_{last})^{th}$ meter reading values, which are the last values from the one-week learning period, are used to find the meter reading difference ratio $P_{n(0-last)}$ and processing proceeds to the next step, Step S37.

In Step S37, the above meter reading difference ratio $P_{n(0-last)}$ is saved as the meter reading difference ratio average value $P_{AVE}$ and then processing proceeds to Step S38.

In Step S38, the meter reading difference ratios $P_n$ saved in the specified memory locations M (X, Y) are used to determine the leakage determination meter reading time band described above (here, from 11:00 pm to 12:00 am) and this determines the leakage determination meter reading time (11:00 pm). The learning then ends.

In the learning described above, in the event that there are branch meters still unread, or the gas volume that passed through the main meter is extremely low, the data from such cases causes degradation of the accuracy of leakage determination. For this reason, in the event that a branch meter is unread, the meter is re-read only once and if the meter cannot be read after re-reading, the meter reading value is considered invalid. In this case, there will be no previous meter reading value during the calculation of the $P_n$ value for the next meter reading, so the next-previous meter reading value is used to calculate the $P_n$ value.

In addition, in the event that the gas volume passing through the main meter is less than 0.5 $m^3$, the $P_n$ value for this case is not included in the learning results.

Figure 5:
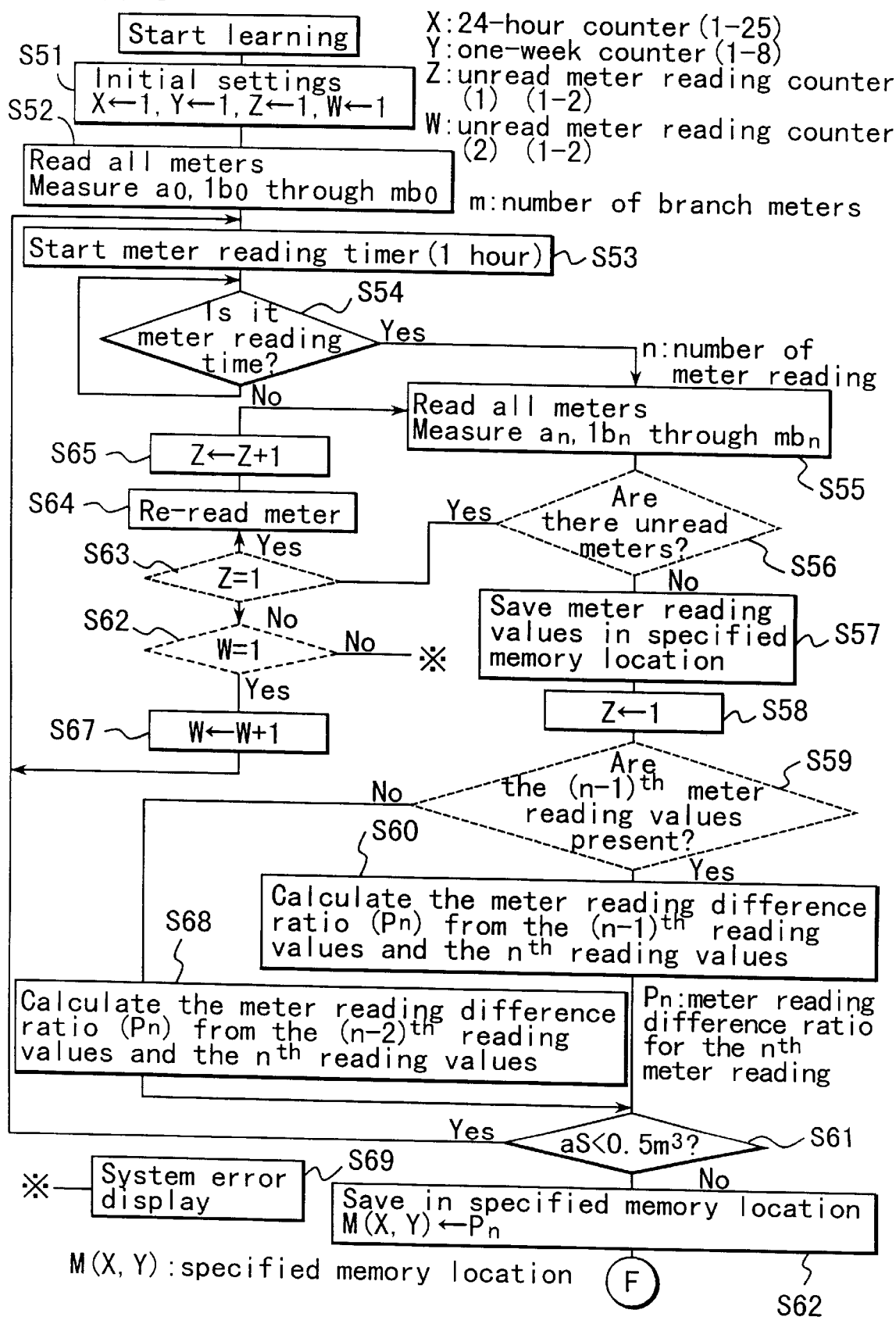
FIG. 5 is a flow chart of a learning method that incorporates updating.

FIG. 5 is a flow chart of a learning method that incorporates the updating described above.

In this learning method, first, in Step S51, a count value X for a 24-hour counter (1–25), a count value Y for a one-week counter (1–8), a count value Z for an unread meter counter (1, 2) and a count value W for an unread meter counter (1, 2) are all set to 1 as their initial settings, and then processing proceeds to Step S52.

In Step S52, the gas meter (main meter) 112 and gas meters (branch meters) 122 are read and then processing proceeds to Step S53.

In Step S53, a meter reading timer is started and then processing proceeds to Step S54. In the next step, Step S54, a determination is made as to whether or not the set time of the meter reading timer has elapsed, and if the set time has elapsed, processing proceeds to the next step, Step S55. Note that this meter reading is the $n^{th}$ (n=0, 1, 2, . . . ) meter reading.

In Step S55, all gas meters 112 and 122 are read in the same manner as in Step S52 and then processing proceeds to Step S56. Here, let $a_n$ be the meter reading value from the gas meter (main meter) 112 and let $1b_n$ through $mb_n$ be the meter reading values from the gas meters (branch meters) 122 (m is the total number of branch meters).

In Step S56, a determination is made as to whether or not there are any unread gas meters, and if there are any unread gas meters then processing proceeds to Step S63.

In Step S63, a determination is made as to whether or not the count value Z for the unread meter counter is 1, and if Z is 1 then this is the first time that the gas meter in question is unread, so processing proceeds to Step S64 and the meter is re-read and then processing proceeds to Step S65.

In Step S65, the count value Z is incremented by 1 and processing returns to Step S55 and the portion starting with Step S55 is executed. In the current Step S55, the unread gas meter in question is subject to reading.

If on the other hand, Z is not 1 in Step S63 but Z=2, namely the case in which a meter could not be read even when re-read, in this case processing proceeds to Step S66 and a determination is made as to whether or not the count value W for the unread meter counter is 1. If W is not 1 but W=2, namely case in which the meter could not be read even when re-read occurred two times, in this case processing proceeds to Step S69 and a system error is displayed and this learning flow ends.

If on the other hand W=1, then processing proceeds to Step S67, W is incremented by 1 and processing then returns to Step S53 and the portion starting with Step S53 is executed.

If it is determined that there are no unread gas meters in Step S56 above, processing proceeds to Step S57 and the meter reading values $a_n$, $1b_n$ ... are saved in memory and then processing proceeds to Step S58.

In Step S58, Z is set to 1 and processing proceeds to Step S59. In Step S59, a determination is made as to whether or not the previous $(n-1)^{th}$ meter reading values are present; processing proceeds to Step S60 if those meter reading values are present, or to Step S68 if not.

In Step S60, the previous $(n-1)^{th}$ meter reading values and the current $n^{th}$ meter reading values are used to find the meter reading difference ratio $P_n$ and then processing proceeds to Step S61.

In Step S60, the next-previous $(n-2)^{th}$ meter reading values and the current $n^{th}$ meter reading values are used to find the meter reading difference ratio $P_n$ and then processing proceeds to Step S61.

In Step S61, a determination is made as to whether or not the gas volume that passed through the main meter $a_s$ is 0.5 $m^3$ or less, and if $a_s < 0.5$ $m^3$, then processing returns to Step S54 and the meter reading difference ratio $P_n$ found this time is not used, assuming that leakage determination cannot be performed with good accuracy.

Note that in the event that the gas volume that passed through the main meter as is less than the reference value (0.5 $m^3$), in addition to the method described above, there is also another method in which the meter reading interval time $\Delta T$ is lengthened so that the gas volume that passed through the main meter as exceeds the reference value and that data is used.

If on the other hand, $a_s \geq 0.5$ $m^3$, then processing proceeds to Step S62.

In Step S62, the meter reading difference ratios $P_n$ found this time are saved in the specified memory locations M (X, Y). Then, flow of the same content as that of Step S27 and thereafter on FIG. 4 is executed, and the meter reading difference ratio average value $P_{AVE}$, maximum value of the meter reading difference ratios $P_{MAX}$ and the minimum value of the meter reading difference ratios $P_{MIN}$ and the like used in the gas leakage determination process described above are determined.

As described above, the gas leakage detection device 20 automatically performs the work of receiving the meter reading values from the main meter 112 and branch meters 122 and determining whether or not there is any gas leakage, so the determination of gas leakage can be performed easily and reliably.

The result of this determination is sent to the LP gas supplier 30, so gas leakage can be kept under constant surveillance. In addition, an alarm is sounded at the LP gas supplier 30 when gas leakage is detected, so the LP gas supplier 30 side can immediately handle the situation.

In addition, the determination of gas leakage performed by the gas leakage detection device 20 incorporates the meter reading difference ratio average value $P_{AVE}$, maximum value of the meter reading difference ratios $P_{MAX}$, minimum value of the meter reading difference ratios $P_{MIN}$, leakage determination meter reading time and the like, which are obtained as a result of learning, so the determination can be performed more accurately.

Since adequate time is taken for this learning, the above meter reading difference ratio average value $P_{AVE}$ and the like can be determined based upon reliable data, so the determination of gas leakage is also reliable.

In addition, during the determination of gas leakage, three reference ratios (the first reference ratio, second reference ratio and third reference ratio) are used to generate results of determination in stages, so the accuracy of the results of determination is high and thus the LP gas supplier 30 can take the correct action based on these results of determination.

In addition, the first reference ratio is set to include an error range $\Delta R$, so false alarms due to error (deviation) can be avoided yet gas leakage can be detected reliably.

In the above description, the gas leakage detection system of the present invention is applied to a gas supply system in an apartment building, but it can also be applied to collective housing of any type in the same manner as long as it is a gas supply system within a field.

In addition, the gas leakage detection device 20 is installed on the side of the apartment building or other collective housing area, but it may also be installed in another location, such as within the LP gas supplier 30. In this case, the meter reading signals from the main meter and branch meter need only be sent by ordinary public lines (telephone lines) 40.

Moreover, the meter reading at the time of determination is performed at specified times, but the meter reading can be performed by another method, for example, when a specified gas volume passing through the main meter is detected or the like.

In addition, while the gas leakage detection system of the present invention is applied to a supply system for LP gas, as long as a field of a definite scope is formed, it can also be applied in the same manner to a supply system for municipal natural gas. In this case, the main meter is provided at the main side of the gas lines that branch out to each household (midway through the pipeline).

By means of the gas leakage detection system of the present invention, the work of receiving the amount of gas supplied and amount of gas used and determining whether or not leakage is present can be performed automatically, so the determination of gas leakage can be performed easily and reliably.

The result of this determination is sent to the LP gas supplier or other central office, so gas leakage can be kept under constant surveillance.

In addition, an alarm is sounded at the central office when gas leakage is detected, so the central office side can immediately handle the situation.

We claim:

1. A gas leakage detection system with a gas line having a main side and individual gas users branched out from the main side, for detecting leakage of gas from the gas line, said system comprising;

a main meter provided at the main side for detecting the amount of gas supplied from the main side of said gas line, branch meters provided at said individual gas users for detecting the amount of gas used by each of said individual gas users, a gas leakage detection device connected to said main meter and connected to each of said branch meters for detecting leakage of gas from said gas line based on meter reading values from said main meter and from each of said branch meters, and a surveillance center that receives results of determination from said gas leakage detection device by telephone lines and has a display device displaying said results;

wherein said gas leakage detection device receives a first meter reading value from said main meter and a first meter reading value from each of said branch meters at a first same time, and receives a second meter reading value from said main meter and a second meter reading value from each of said branch meters, at a second same reading time after a predetermined time from said first same time;

said detection device obtains a meter reading difference of said main meter ($a_s$) in said predetermined time by subtracting said first meter reading value from said second meter reading value, thereby rendering said meter reading difference the amount of gas supplied in said predetermined time;

said detection device adds the first meter reading values of said individual branch meters together for obtaining a first sum, and adds the second meter reading values of the branch meters together for obtaining a second sum, and subtracts said first sum from said second sum for obtaining a meter reading difference of said branch meters ($b_s$) in a predetermined time, thereby rendering said difference the amount of gas used;

said detection device subtracts said meter reading difference of said branch meters from said meter reading difference of said main meter for obtaining a meter reading difference ($a_s$–$b_s$) and obtains a ratio of said meter reading difference ($a_s$–$b_s$) to said meter reading difference of said main meter, thereby rendering said ratio a differential volume ratio (a meter reading difference ratio) P;

said detection device compares said differential volume ratio and a first reference ratio found by adding an error range $\Delta R$ set in accordance with the number of the individual gas users to a meter reading difference ratio average value $P_{AVE}$ found in advance empirically upon confirming that no gas leakage in said gas line occurs, and sends information of definite leakage to said display device in said surveillance center when said differential volume ratio is greater than said first reference ratio;

said detection device compares said differential volume ratio and a second reference ratio $P_{MAX}$ that is the maximum value of said meter reading difference ratios found empirically and that is smaller than said first reference ratio, when said differential volume ratio is not greater than said first reference ratio, and sends information regarding possible leakage to said display device in said surveillance center when said differential volume ratio is greater than said second reference ratio $P_{MAX}$; and when said differential volume ratio is not greater than said second reference ratio $P_{MAX}$, then said detection device compares said differential volume ratio and a third reference ratio $P_{MIN}$ that is the minimum value of meter reading difference ratios found empirically, and when said difference ratio is greater than said third reference ratio $P_{MIN}$, then sends information regarding no leakage to said display device in said surveillance center, and when said differential volume ratio is smaller than said third reference ratio $P_{MIN}$, then sends information of system abnormality to said display device in said surveillance center: whereby said gas leakage detection system enables said surveillance center to handle situations depending on the results on the display device.

\* \* \* \* \*

UNITED STATES PATENT AND TRADEMARK OFFICE
CERTIFICATE OF CORRECTION

PATENT NO. : 5,866,803
DATED : February 2, 1999
INVENTOR(S) : Mitsuo NAMBA, et al.

It is certified that error appears in the above-indentified patent and that said Letters Patent is hereby corrected as shown below:

On the title page, item [73] should be:

--[73] Assignee: Japan as Represented by Director General of
Agency of Industrial Science and Technology,
Tokyo, Japan--

Signed and Sealed this

Fifth Day of October, 1999

*Attest:*

Q. TODD DICKINSON

*Attesting Officer*   Acting Commissioner of Patents and Trademarks